Figure 11:
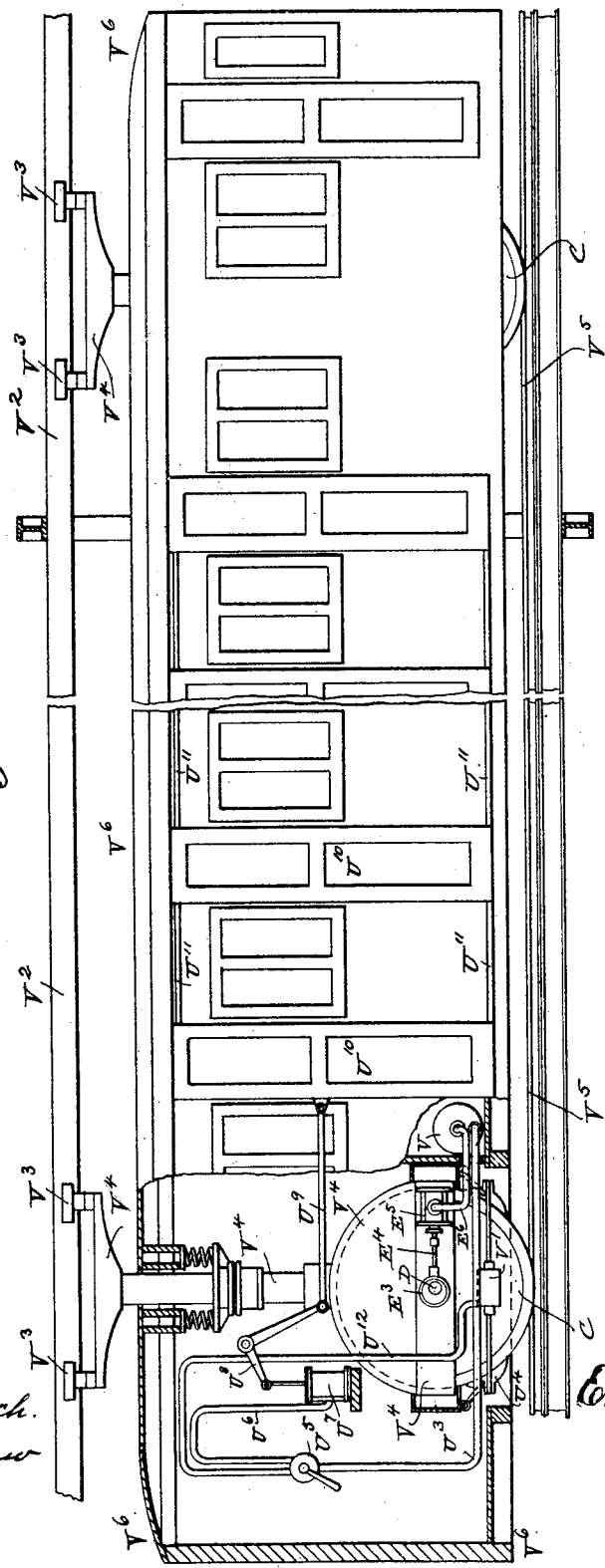

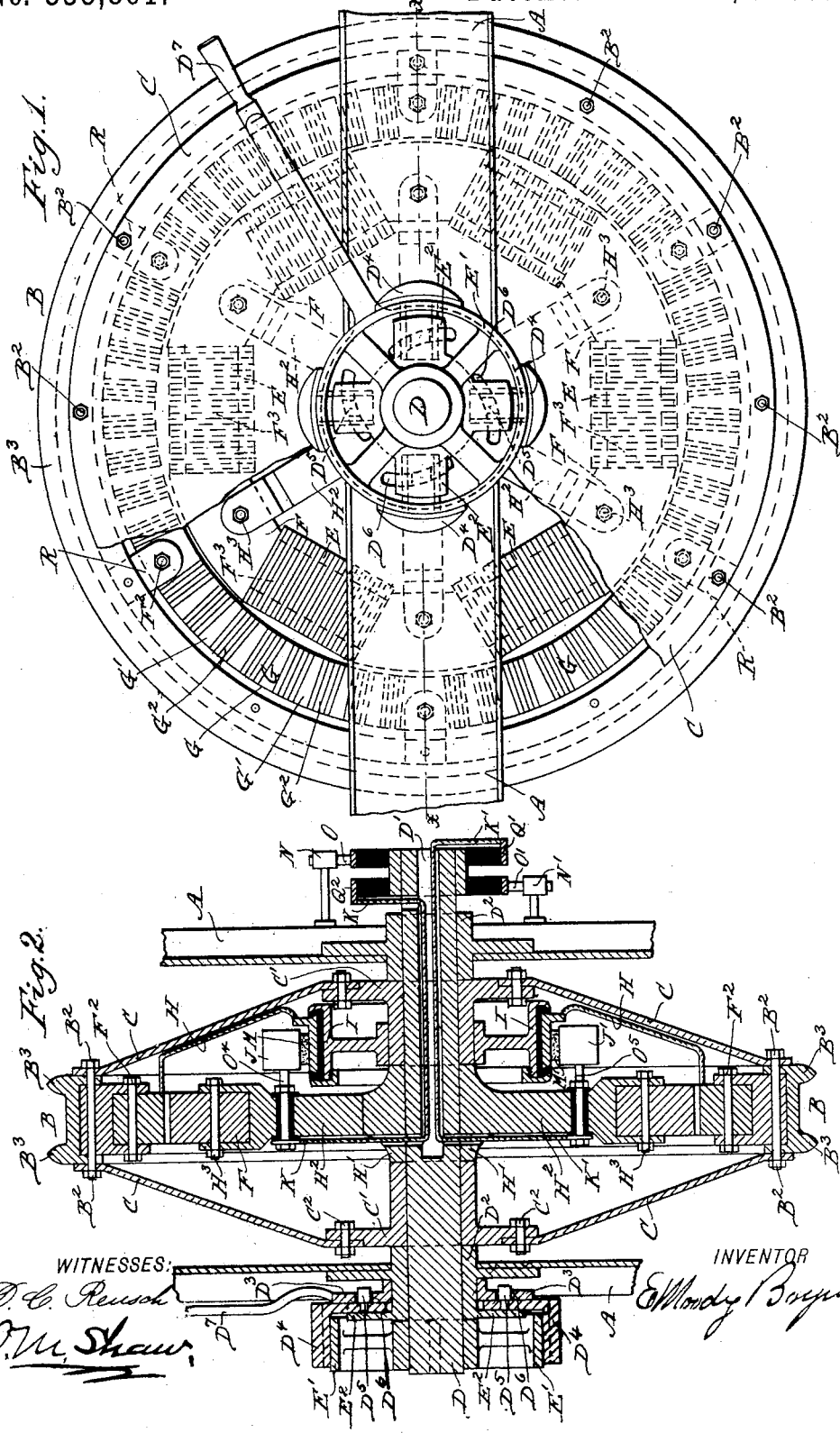

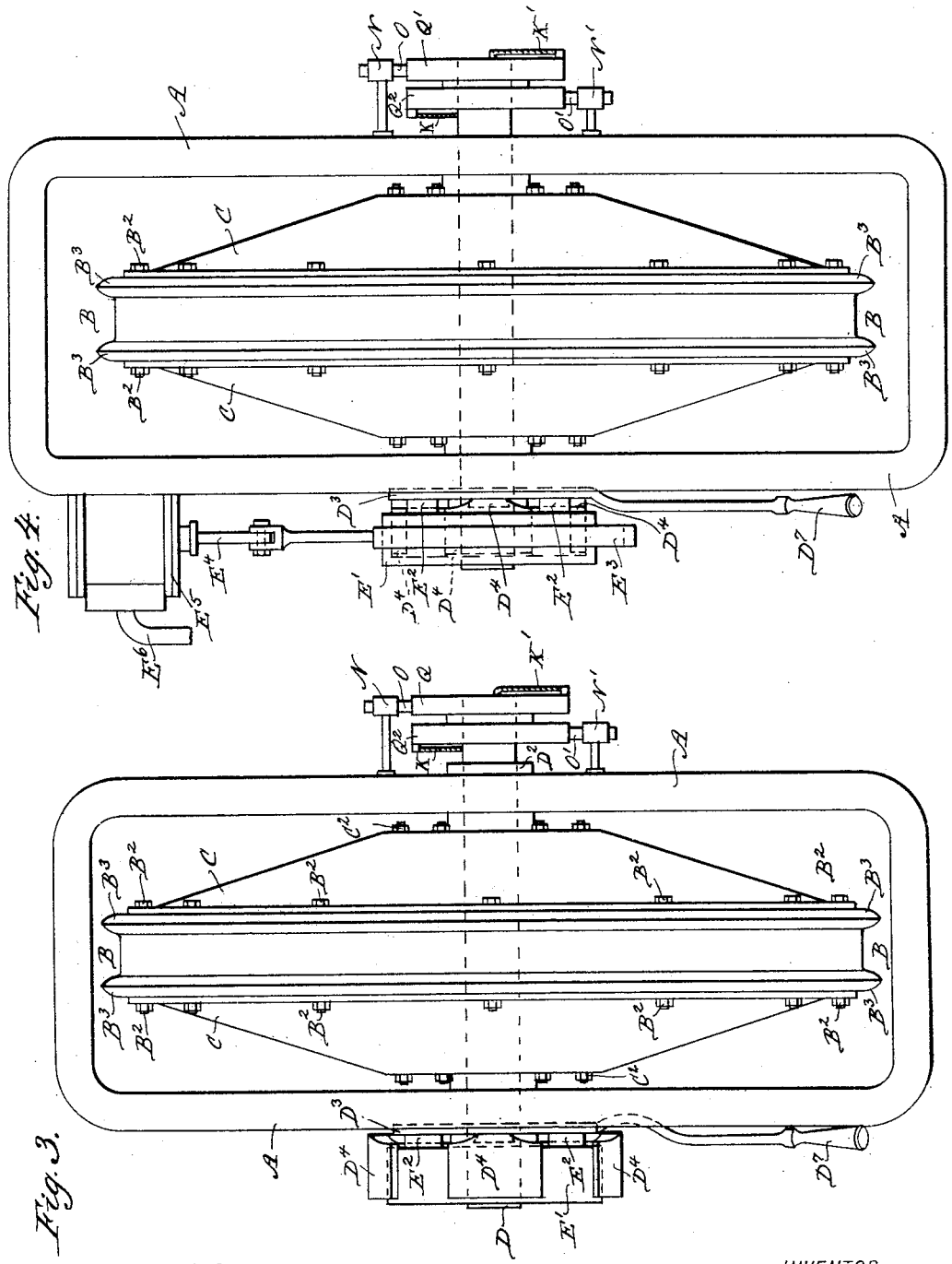

(No Model.) 5 Sheets—Sheet 3.
E. M. BOYNTON.
ELECTRIC LOCOMOTIVE.
No. 533,861. Patented Feb. 12, 1895.
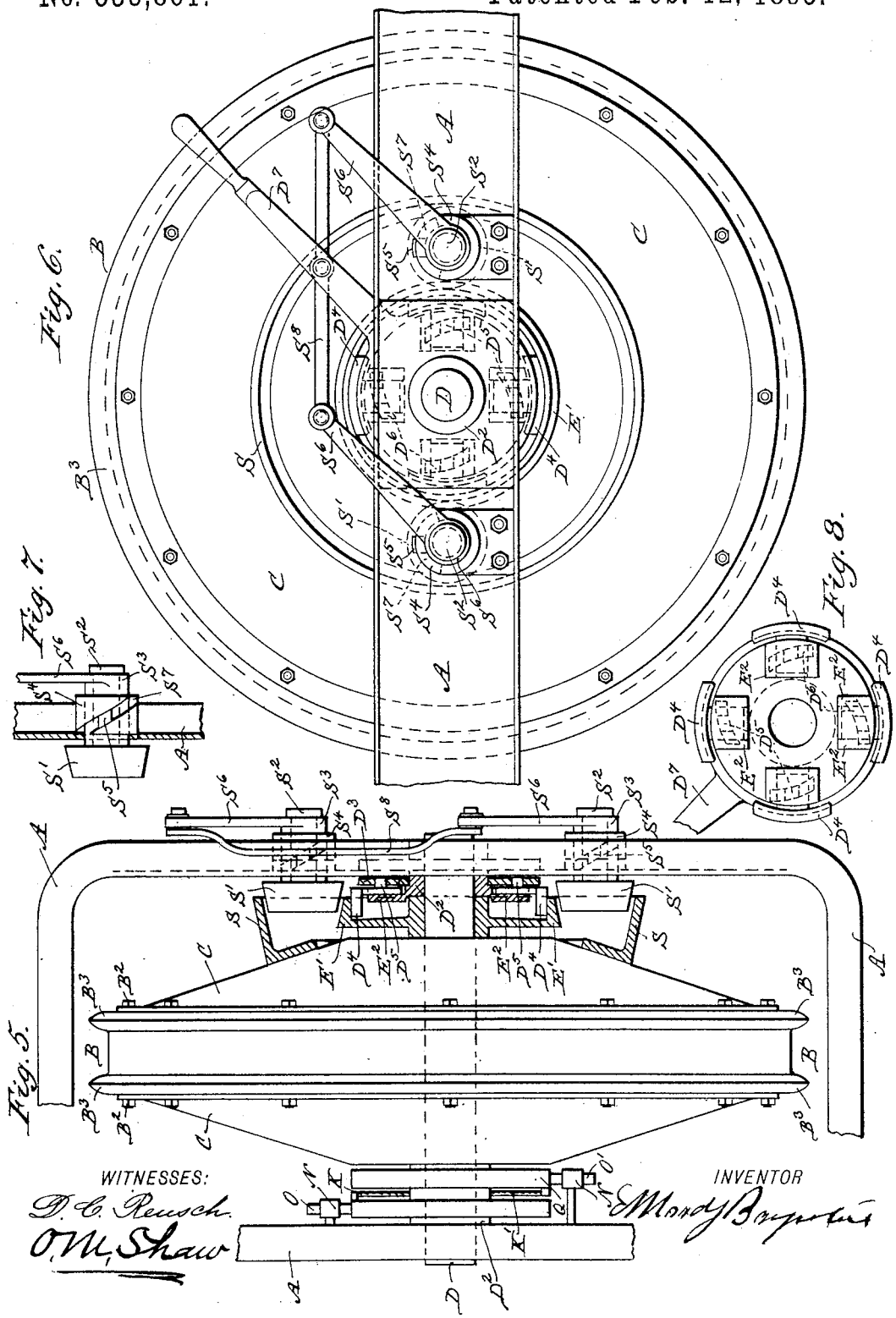
WITNESSES:
D. C. Reusch
O. M. Shaw
INVENTOR
E. Moody Boynton (No Model.) 5 Sheets—Sheet 4.
E. M. BOYNTON.
ELECTRIC LOCOMOTIVE.
No. 533,861. Patented Feb. 12, 1895.
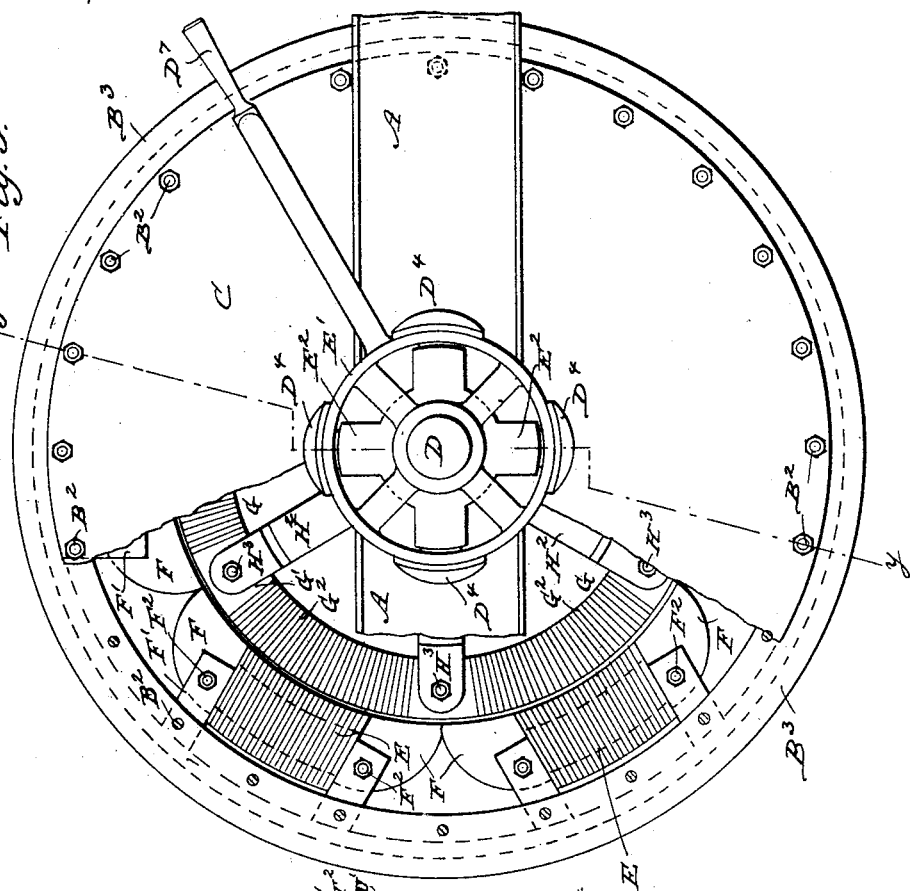
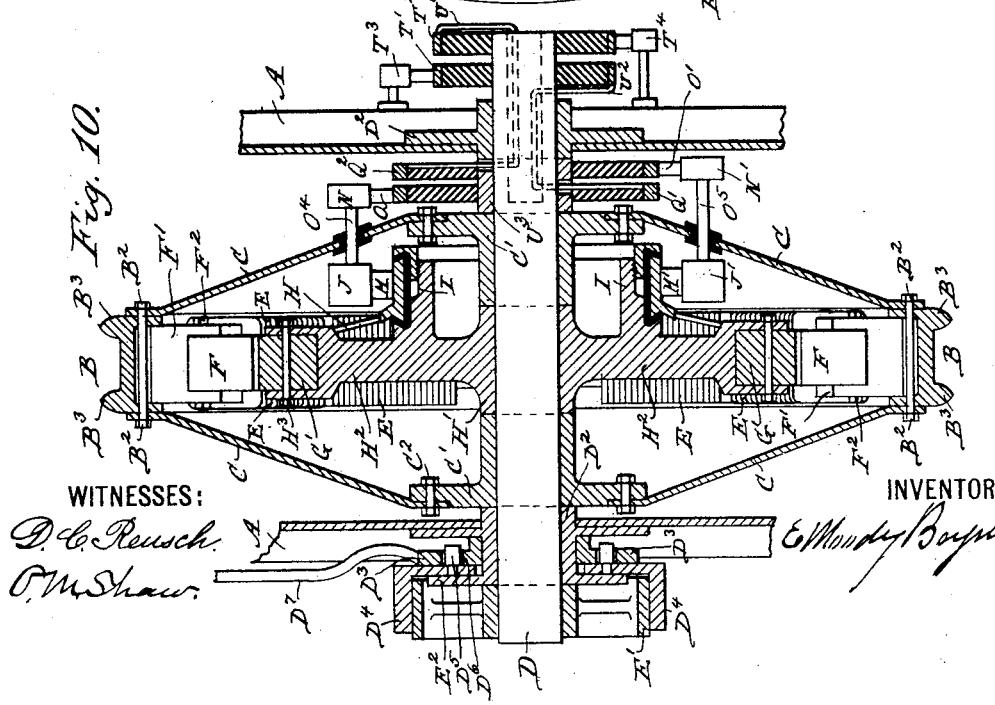
WITNESSES:
D. C. Reusch.
O. M. Shaw.
INVENTOR
E. Moody Boynton
THE NORRIS PETERS CO., PHOTO-LITHO., WASHINGTON, D. C.

(No Model.) 5 Sheets—Sheet 5.
E. M. BOYNTON.
ELECTRIC LOCOMOTIVE.

No. 533,861. Patented Feb. 12, 1895.

WITNESSES:
D. C. Reusch.
O. M. Shaw

INVENTOR
E. Moody Boynton

UNITED STATES PATENT OFFICE.

EBEN MOODY BOYNTON, OF WEST NEWBURY, MASSACHUSETTS.

ELECTRIC LOCOMOTIVE.

SPECIFICATION forming part of Letters Patent No. 533,861, dated February 12, 1895.

Application filed April 9, 1894. Serial No. 506,965. (No model.)

*To all whom it may concern:*

Be it known that I, EBEN MOODY BOYNTON, a citizen of the United States, and a resident of West Newbury, in the county of Essex and State of Massachusetts, have invented certain new and useful Improvements in Electric Locomotives, of which the following is a specification.

My invention relates to improvements in the driving wheels of electric locomotives running on one rail.

It is a known fact, that a motor of the gearless type, where the armature is fastened directly to the shaft, consumes more time in gaining its critical speed, than a motor with reducing gear. It is therefore for a longer time exposed to the heavy starting current than a motor of the latter type. There is a reaction between the armature and the field-magnets, each tending to revolve in an opposite direction, and as the counter-electromotive force depends upon the relative speed between the armature and field-magnets, it would make no difference if one is stationary and the other moving or if both are moving in opposite directions.

When the armature is the element revolving with the wheel and the field-magnets the stationary one, it is the aim of my invention to so arrange the motor that the field-magnets might be released and permitted to revolve at a speed that would generate an electromotive force of sufficient strength, and then little by little reduce its speed and thus increase its reactive pull on the armature until the field-magnets come to a complete rest, the whole reaction then being utilized in propelling the locomotive.

The field-magnets may be connected with the frame of the motor by means of a friction-clutch and the work of the revolving shaft consumed in friction, or the work may be stored up by pumping air into a reservoir to be utilized in operating the brakes or other appliances; or the work done by the shaft may be utilized directly for propelling the car, and by properly-proportioned reducing gear a high speed motor thus be changed into one of slower speed, but with greater tractive power, enabling it to start quickly and climb up heavy grades.

I attain all these objects by means illustrated in the accompanying drawings, in which—

Figure 1 is a side elevation of the motor wheel with the frame partly broken away. Fig. 2 is a cross-section of the same taken on line $x\,x$. Fig. 3 is a plan view of the motor-wheel with the surrounding frame. Fig. 4 is another plan view illustrating a modified form of the clutch, the latter being made part of an air compressor. Fig. 5 is a plan view of the motor-wheel partly in section illustrating a mechanism for reducing the speed of the wheel to one lower than that of the revolving shaft. Fig. 6 is an elevation of the same. Fig. 7 is a detail view of one of the wheels connecting the shaft with the motor wheel. Fig. 8 illustrates details of clutch mechanism. Fig. 9 is a side elevation of a motor with the field-magnets fastened to the wheel-tire. Fig. 10 is a cross-section of the same, taken on line $y\,y$. Fig. 11 is a side elevation, partly broken away, of the motor car in connection with the railroad structure, also illustrating the use of compressed air for operating the brakes and the doors.

Referring to the drawings Figs. 1 and 2, A is the framework of the motor, which may be connected with the car in any suitable manner.

B is the wheel-tire with flanges $B^3\,B^3$ and bolts $B^2$ connecting it with the wheel-web C.

$C'\,C'$ are hubs revolving loose on shaft D and connected to C by means of bolts $C^2\,C^2$. The shaft D is journaled in the bearings $D^2\,D^2$, fastened to the motor-frame A A.

G is the armature; $G'$, the armature core, and $G^2$ the coils. Brackets R R, fastened to the armature by bolts $F^2\,F^2$ and to the wheel-tire by bolts $B^2\,B^2$, connect the armature with the wheel.

The hub $H'$ is keyed to the shaft D and is provided with arms $H^2\,H^2$ that carry the pole pieces F F, bolts $H^3\,H^3$ connecting them.

E E are field-magnet coils and $F^3$ cores.

The commutator I is fastened to one of the hubs $C'$ and joined to the armature by wires H H.

The brush $O'$ in brushholder $N'$ receives the current from an overhead conductor placed in the guide $V^2$ (Fig. 11) and transmits it to the ring $Q^2$, insulated from the shaft. The wire K conducts the current from $Q'$ to the bar $O^4$ with brushholder J and brush M to the commutator I, from this by means of wires H H through the armature G and back to the commutator again, through brush M', brushholder J', bar $O^5$, conductor K' to the ring Q', brush O and brushholder N to the supporting rail $V^5$.

It will be seen that when the shaft D with the field-magnets F F is stationary, the motor acts as any ordinary motor. It is first when the shaft D is permitted to rotate at different speeds, that the conditions are altered. Naturally the reaction between the armature and the field-magnets will cause the latter to rotate in an opposite direction to that of the former, and that therefore there must be some means provided to hold the shaft stationary, when it is desired that the motor-wheel shall develop its highest speed. This can be accomplished in many ways, but it will only be necessary to illustrate one of these.

On an elongation of one of the bearings $D^2$ are four projections $E^2$ $E^2$ in which the shoes $D^4$ slide. The latter are provided with studs $D^5$ projecting through slots $D^6$ in the disk $D^3$, the latter being revoluble on the bearing $D^2$ and provided with a handle $D^7$. The shoes $D^4$ are embracing a pulley E' keyed to the shaft D. As the slots $D^6$ are parts of a spiral, a movement of the disk $D^3$ either to the right or the left (Fig. 1) will correspondingly press the clutches against the pulley or release the latter. It will therefore be possible to regulate the speed of the shaft from full speed down to complete rest.

I do not limit myself to any special form of apparatus for fastening the shaft to the frame or releasing it, as this may be done in many different ways.

It stands to reason that the reactive power of the shaft may be utilized in doing useful work instead of being consumed in friction. This I illustrate in Fig. 4. The pulley is there provided with an eccentric $E^3$ which by means of piston-rod $E^4$ operates a piston in cylinder $E^5$ thus pumping the air through the tube $E^6$, that may connect with an air-reservoir for operating air-brakes, &c. The shoes are in this instance interior to the pulley rim.

It may in some cases be necessary to reduce the speed and increase the pulling power when starting under a heavy load or running up a steep grade. This can be accomplished in different ways and I have in Figs. 5 and 6 used a friction gear for this purpose.

E' is a disk with a conical rim keyed to the shaft D having in its interior a friction-clutch for keeping it stationary or releasing it. S' S' are two intermediate gears by means of which the disk E' may be connected with conical ring S fastened on the wheel-web C. When E' is released and the gears S' S' moved to the left, (Fig. 5) S will be compelled to revolve at a certain speed relative to E' depending on the relative proportion of their diameters, thus serving as a reducing gear. The release of the disk E' and the forward movement of the gears S' S' is done simultaneously by moving the lever $D^7$ (Fig. 6) to the right. The gear S' (see Fig. 7) is journaled in the tubular bearing $S^3$ provided with a stud $S^5$ engaging with a spiral groove in an exterior bearing $S^4$. When therefore $S^3$ is revolved around its axis by means of lever $S^6$, it will also have a longitudinal movement and be pushed against S and E', when lever $S^6$ is moved to the right, and vice versa.

I do not limit myself to having the armature fastened to the wheel-tire, but may, if found desirable reverse the arrangement and have the armature fastened to the shaft and the field-magnets revolve with the wheel. Figs. 9 and 10 illustrate this form of the motor, the main difference being, that the brushes M M' in brush holders J J' have their rods $O^4$ $O^5$ supported by the wheel-web C. Brush holders N N' with brushes O O' take the current from contact rings Q' $Q^2$ insulated from, but fastened to the shaft and by wires U' $U^2$ connected with an additional pair of contact rings T' $T^2$ to which current is supplied by brushes $T^3$ $T^4$ one of which connects with the overhead conductor W (Fig. 11) and the other with the supporting rail $V^5$. In this case the armature G is supported by the spider $H^2$, its hub H' being keyed to the shaft D. Brackets F' F' fastened to the field-magnets F F by means of bolts $F^2$ $F^2$ and to the wheel-tire by bolts $B^2$ $B^2$ connect field-magnets and wheel-tire.

In Fig. 11 I have attempted to illustrate how the revolutions of the shaft D may be utilized to pump air into the reservoir V, connected with the pump $E^5$ by the tube $E^6$; the eccentric $E^3$ with connecting-rod $E^4$ operating the pump. The tube $U^3$ leads from the reservoir to a regulating valve $U^5$ from which tubes $U^6$ and $U^{12}$ lead, the latter for furnishing pressure in the brake-cylinder V' for the operation of brakes $U^4$ $U^4$, and the other serving to operate a piston in the cylinder $U^7$, said piston moving the lever $U^8$ backward or forward, thus by means of the rod $U^9$ opening or closing the sliding doors $U^{10}$ $U^{10}$ connected together with rods $U^{11}$ $U^{11}$.

$V^6$ is the carbody, spring-supported by the frame-work $V^4$, the latter having at its lower end the shaft D journaled in it, and carrying at its upper end the guide-wheels $V^3$ $V^3$ embracing the guide $V^2$.

Having thus described my invention, I claim as new and desire to secure by Letters Patent—

1. In a single rail supported railroad car the combination with the car body of a frame fastened to same near one end thereof having guide-wheels engaging with an upper guide-rail, a driving wheel having removable web-plates fastened to hubs revolving loose on a shaft situated in said frame, armature and field-magnet elements situated between said web-plates and one element fastened to the wheel-tire and the other element to the shaft, and means for fastening said shaft to the motor frame or allowing it to rotate, substantially as set forth.

2. In a single rail supported railroad car the combination with the car body of a frame fastened to same near one end thereof having guide-wheels engaging with an upper guide-rail, a driving wheel having removable web-plates fastened to hubs revolving loose on a shaft situated in said frame, armature and field-magnet elements situated between said web-plates and one element fastened to the wheel-tire and the other element to the shaft, means for fastening said shaft to the motor-frame or allowing it to rotate and means for utilizing the rotations of the shaft for the operation of sundry appliances situated on the car, substantially as set forth.

3. In a single rail supported railroad car the combination with the car body of a frame fastened to same near one end thereof having guide-wheels engaging with an upper guide-rail, a driving-wheel having removable web-plates fastened to hubs revolving loose on a shaft situated in said frame, armature and field-magnet elements situated between said web-plates and one element fastened to the wheel-tire and the other element to the shaft, means for fastening said shaft to the motor-frame or allowing it to rotate, and means for transmitting the rotations of the shaft to the wheel, substantially as set forth.

Signed at New York, in the county of New York and State of New York, this 2d day of April, A. D. 1894.

E. MOODY BOYNTON.

Witnesses:
D. C. REUSCH,
GEO. H. CARY.